US012699266B2

(12) United States Patent
To et al.

(10) Patent No.: US 12,699,266 B2
(45) Date of Patent: Aug. 4, 2026

(54) HEAD UP DISPLAY WITH IMPROVED RESISTANCE TO SUNLOAD FOR USE IN A VEHICLE

(71) Applicant: N.S. International, Ltd., Troy, MI (US)

(72) Inventors: Ethan Hoang To, Royal Oak, MI (US); Saumil Satish Wagle, Mumbai (IN); Arul Krishna, West Bloomfield, MI (US); Katsuhiro Tanaka, Troy, MI (US); Indrajeet Gupta, Troy, MI (US)

(73) Assignee: N.S. International, Ltd., Troy, MI (US)

( * ) Notice: Subject to any disclaimer, the term of this patent is extended or adjusted under 35 U.S.C. 154(b) by 304 days.

(21) Appl. No.: 18/217,312

(22) Filed: Jun. 30, 2023

(65) Prior Publication Data

US 2024/0004192 A1     Jan. 4, 2024

Related U.S. Application Data

(60) Provisional application No. 63/357,900, filed on Jul. 1, 2022.

(51) Int. Cl.
G02B 27/01 (2006.01)
G02B 5/10 (2006.01)
(Continued)

(52) U.S. Cl.
CPC ........... G02B 27/0101 (2013.01); G02B 5/10 (2013.01); G02B 5/282 (2013.01);
(Continued)

(58) Field of Classification Search
None
See application file for complete search history.

(56) References Cited

U.S. PATENT DOCUMENTS 7,355,796 B2 * 4/2008 Robinson ........... G02B 27/0101
359/13
8,089,568 B1 * 1/2012 Brown ............... G02B 27/0172
349/96
(Continued)

FOREIGN PATENT DOCUMENTS

JP 2007065137 A * 3/2007
JP 2013174855 9/2013
(Continued)

OTHER PUBLICATIONS

3M Cold Mirror Film (CMF), 2020 Technical Data, 3M Display Materials & System Division, St. Paul, MN, 3M.com/displayfilms.
(Continued)

*Primary Examiner* — Ryan Crockett
(74) *Attorney, Agent, or Firm* — Clark Hill PLC

(57) ABSTRACT

A head up display (HUD) with improved resistance to sunload for use in a vehicle comprising an image generating device, an LCD assembly, an optical bonding assembly, and a fold mirror, with specific design countermeasures to combat damage caused to an LCD by heat from sunlight. These include an OB glass and cold mirror film (CMF) as components of the optical bonding assembly, a hot mirror coating and a polarized film as components of the LCD assembly, and a cold mirror coating on the fold mirror. When sunlight enters the HUD, the cold mirror coating reflects only visible light towards the LCD. The hot mirror coating reflects infrared and ultraviolet wavelengths of light away from the LCD. The polarized film cuts p-polarized light. The OB glass and CMF increase the specific heat of the HUD. The HUD thereby reduces sunload that would otherwise damage the LCD due to heat stress.

20 Claims, 8 Drawing Sheets

(51) Int. Cl.
    *G02B 5/28*         (2006.01)
    *G02F 1/1333*       (2006.01)
    *G02F 1/1335*       (2006.01)
    *G03B 21/16*        (2006.01)

(52) U.S. Cl.
    CPC .. *G02F 1/133331* (2021.01); *G02F 1/133521*
        (2021.01); *G02F 1/133536* (2013.01); *G02F*
        *1/133553* (2013.01); *G03B 21/16* (2013.01);
        *G02B 2027/0118* (2013.01)

(56)         References Cited

U.S. PATENT DOCUMENTS

| | | | | |
|---|---|---|---|---|
| 10,459,574 | B2 * | 10/2019 | Thomas | G06F 3/0321 |
| 2019/0285884 | A1 * | 9/2019 | Fujita | G02B 27/0101 |
| 2019/0346674 | A1 * | 11/2019 | Miyake | G02B 26/02 |
| 2020/0050054 | A1 * | 2/2020 | Lin | G02B 5/3025 |
| 2021/0191119 | A1 * | 6/2021 | Asanoi | G02B 5/3083 |
| 2023/0280613 | A1 * | 9/2023 | Pasca | G02B 27/0101 |
| | | | | 349/11 |
| 2024/0201491 | A1 * | 6/2024 | Eckstein | G02B 27/0101 |

FOREIGN PATENT DOCUMENTS

| | | |
|---|---|---|
| JP | 2018072488 | 5/2018 |
| JP | 6563711 | 8/2019 |
| JP | 2020095191 | 6/2020 |
| JP | 2020095193 | 6/2020 |
| JP | 6984359 | 12/2021 |
| TW | I657262 | 4/2019 |
| WO | 2020022300 | 1/2020 |
| WO | 2021170636 | 9/2021 |

OTHER PUBLICATIONS

Van Derlofske, John PhD, Pankratz, Steve PhD and Franey, Eileen, New film technologies to address limitations in vehicle display ecosystems, Journal of the Society for Information Display, vol. 28, Issue 12, p. 917-925, Sep. 13, 2020, https://doi.org/10.1002/jsid.965.

* cited by examiner

80

60

52/56

68

44

62

64a

65

54

68

64

64b

65

54

68

66

67

54

68

58

70

58

72

74

76

HEAD UP DISPLAY WITH IMPROVED RESISTANCE TO SUNLOAD FOR USE IN A VEHICLE

TECHNICAL FIELD

The present disclosure relates generally to the field of head up displays (HUDs). More specifically, the present disclosure relates to a HUD with improved resistance to sunload for use in a vehicle.

CROSS REFERENCE TO RELATED APPLICATIONS

This application claims priority to United States Utility Provisional Application Number 63/357,900, filed on Jul. 1, 2022, which is hereby incorporated by reference in its entirety for all purposes.

BACKGROUND

The use of a head up display (HUD) in vehicles is known in the prior art. A HUD is a means of projecting an image directly into a user's visual field in such a way as to overlap a background scene without interfering with the user's view of the background scene. In automobiles, this generally means that information contained in the image is projected onto a portion of a vehicle's windshield in a semi-transparent manner so that a vehicle driver can quickly and easily acquire information such as, but not limited to, speed, navigation assistance, engine performance, and operating conditions, without directing the driver's attention away from the road.

Generally, HUDs utilize an image generating device and a set of lenses to generate a backlight image on a liquid crystal display (LCD). The backlight is then reflected off or transmitted through a plurality of lenses and/or mirrors to define a magnified image on a windshield or other comparable reflective surface. As HUDs have become more prevalent, consumers have demanded larger fields of view and larger image distances in the HUDs. One way to achieve these image distances and field of view requirements is to magnify the image projected on the windshield to at least fifteen times the image on the LCD.

However, under certain solar configurations, sunlight may travel down a path retrograde to that traveled by light from the image generating device. Based on the position of the sun and the vehicle, sunlight may reflect or transmit off or through the plurality of mirrors and/or lenses to focus on the LCD. Heat from the sunlight can then damage the LCD. Experimental results have shown that an increase of LCD surface temperature to greater than 117° C. (or 242.6° F.) can lead to temporary or permanent degradation of function of the LCD. Magnification of sunlight as it is reflected retrograde down the HUD image pathway make it more likely that an LCD surface temperature will rise to these levels, and thus image magnification makes the LCD more susceptible to this type of damage.

Accordingly, there is an unmet need for a HUD utilizing LCD technology with improved resistance to heat from sunlight that resolves the foregoing problems in the prior art.

SUMMARY

The present disclosure provides for an improved head-up display (HUD) for use in a vehicle, comprising a liquid crystal display (LCD) wherein the design provides greater protection from damage to the LCD caused by heat from sunlight. The present disclosure preferably includes an image generating device, an LCD assembly, an optical bonding assembly, and a fold mirror.

In a preferred embodiment, the image generating device comprises a light emitting diode (LED) array and a heat sink.

The LCD assembly preferably comprises an LCD and a hot mirror glass with a front side and a back side, where a hot mirror coating covers the front side of the hot mirror glass, and a polarized film covers the back side of the hot mirror glass. The hot mirror coating reflects infrared (IR) and ultraviolet (UV) wavelengths of light away from the LCD, and the polarized film cuts p-polarized light from the sunlight. Incoming sunlight is unpolarized, which means that is an incoherent combination of linearly or circularly polarized light, and thus has a random, time dependent and rapidly shifting polarization. By removing one field of polarization, i.e., by filtering out the p-polarized energy, the polarized film cuts the total amount of thermal energy conveyed by sunlight in half.

In a preferred embodiment, the optical bonding assembly comprises an optical bonding adhesive to bond an optical bonding ("OB") glass sheet to the back side of the LCD. This OB glass sheet is preferably laminated with a cold mirror film (CMF) which further polarizes the light and cuts p-polarized light. Altogether, the optical bonding assembly increases the specific heat of the LCD and facilitates a reduction in temperature increase due to sunlight.

Preferred embodiments also include a fold mirror between the LCD and the windshield. A cold mirror coating is preferably applied to the fold mirror, which reflects only visible spectrum light towards the LCD.

Taken together, the cold mirror coating on the fold mirror, the hot mirror coating and polarized film on the LCD, and the optical bonding assembly with CMF bonded to the LCD reduce the amount of heat transmitted to the LCD via sunlight. Moreover, upon starting a vehicle, air conditioning takes an average of three minutes to reduce HUD temperatures to a normal temperature, preferably around 25 degrees Celsius, at which point the risk of damage to the LCD is low. The addition of the countermeasures disclosed herein increases the amount of time required for sunlight to heat the LCD surface to 117° C. to over four minutes, thereby reducing the risk of LCD damage due to the intensity of sunlight, or sunload.

A preferred embodiment of the present invention comprises:

A head up display (HUD) with improved resistance to sunload for use in a vehicle, the HUD comprising:

a liquid crystal display (LCD) assembly;

an optical bonding assembly; and an image generating device;

wherein the LCD assembly comprises an LCD and a hot mirror glass;

wherein the hot mirror glass comprises a hot mirror coating and a polarized film; and wherein the optical bonding assembly comprises an optical bonding (OB) glass sheet bonded to the LCD, and a cold mirror film (CMF).

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Embodiments of the present invention relate generally to a head up display (HUD) with improved resistance to sunload for use in a vehicle. The present disclosure describes, in detail, specific embodiments with the understanding that the present invention may be susceptible to embodiments in different forms, and that the present disclosure is considered an exemplification of the principles of the invention and is not intended to limit the invention to that described herein.

Figure 1:
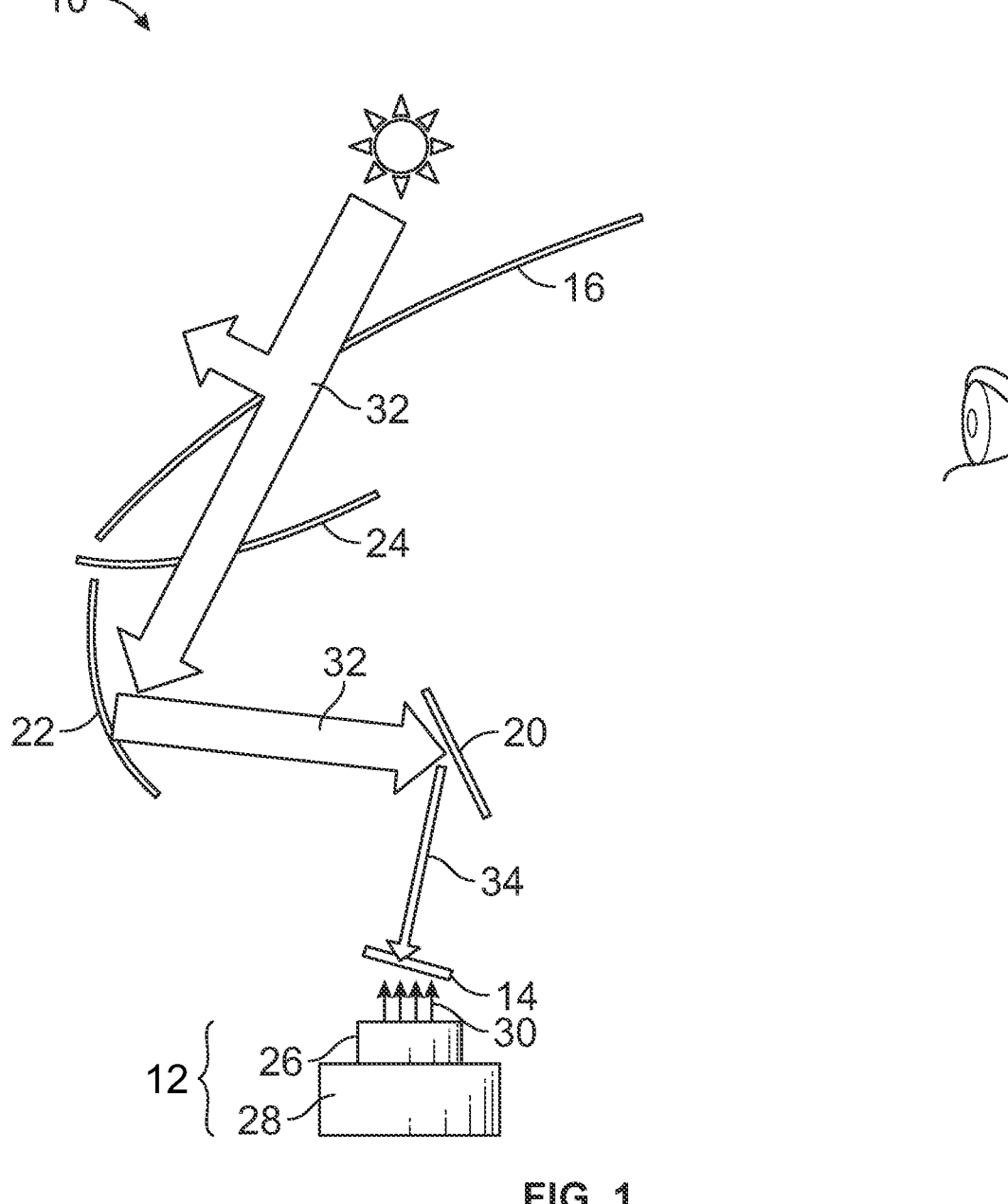
FIG. 1 is a schematic illustrating components of a typical head up display (HUD), and a pathway by which sunlight may travel to focus on an LCD, in accordance with the prior art.

As generally shown in FIG. 1, and in accordance with the prior art, HUDs 10 typically comprise an image generating device 12, a liquid crystal display (LCD) 14, and a plurality of mirrors and/or lenses 20, 22, 24 to display an image on a windshield 16 or other reflective surface for view by a user 18. The plurality of mirrors and/or lenses may generally comprise a fold mirror 20, a concave mirror 22, and a glare trap 24. The image generating device 12 may comprise a light emitting diode (LED) array 26 and a heat sink 28. Generally, HUDs are mounted inside a vehicle by structural casing components that directly interface with the vehicle. Components of the HUD are generally mounted inside of these structural casing components. As further shown in FIG. 1, light emitted from the LED array 26 in the image generating device 12 is generally transmitted as a backlight 30 to define an image on the LCD 14. From there, the backlight 30 is reflected off, and/or transmitted through, the plurality of mirrors and/or lenses 20, 22, 24 down a light pathway to produce an image on the windshield 16. Through this process, the image from the LCD 14 is magnified so that the image reflected on the windshield 16 is larger than that transmitted onto the LCD 14. Consumer demands often dictate that the image reflected on the windshield 16 is over fifteen times greater than the image on the LCD 14.

However, FIG. 1 also illustrates that sunlight 32 can travel retrograde down this light pathway, through/off the plurality of mirrors and/or lenses 20, 22, 24 to focus on the LCD 14. Both the backlight 30 from the image generating device 12, and the sunlight 32, carry heat. Moreover, sunlight 32 transmitted down the light pathway is magnified by the plurality of lenses and/or mirrors 20, 22, 24, creating a focused beam of sunlight 34 and amplifying the heat transmitted to the LCD 14.

Figure 2:
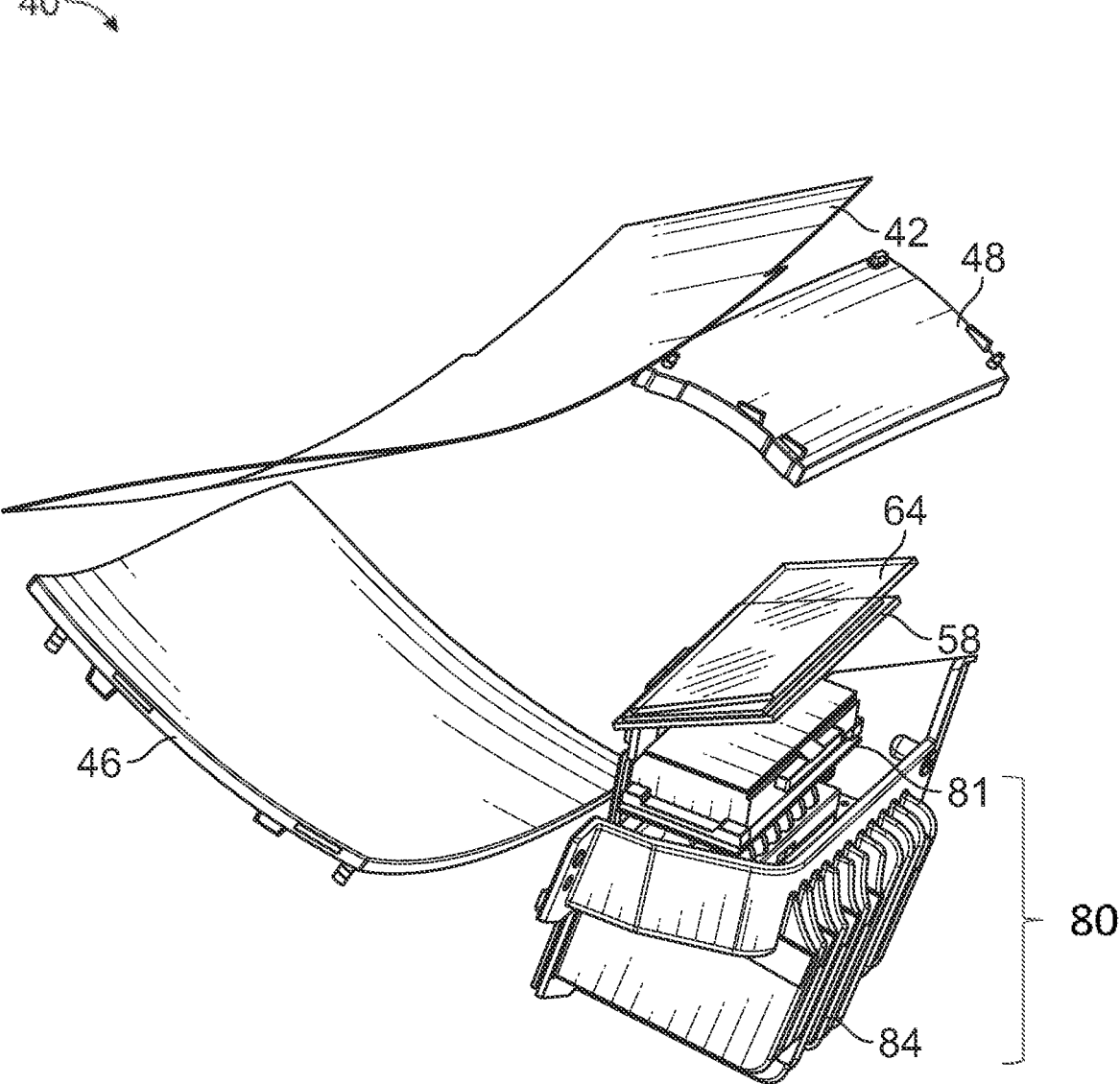
FIG. 2 is a perspective view illustrating a HUD with improved resistance to sunload, provided in accordance with an embodiment of the current disclosure.
Figure 3:
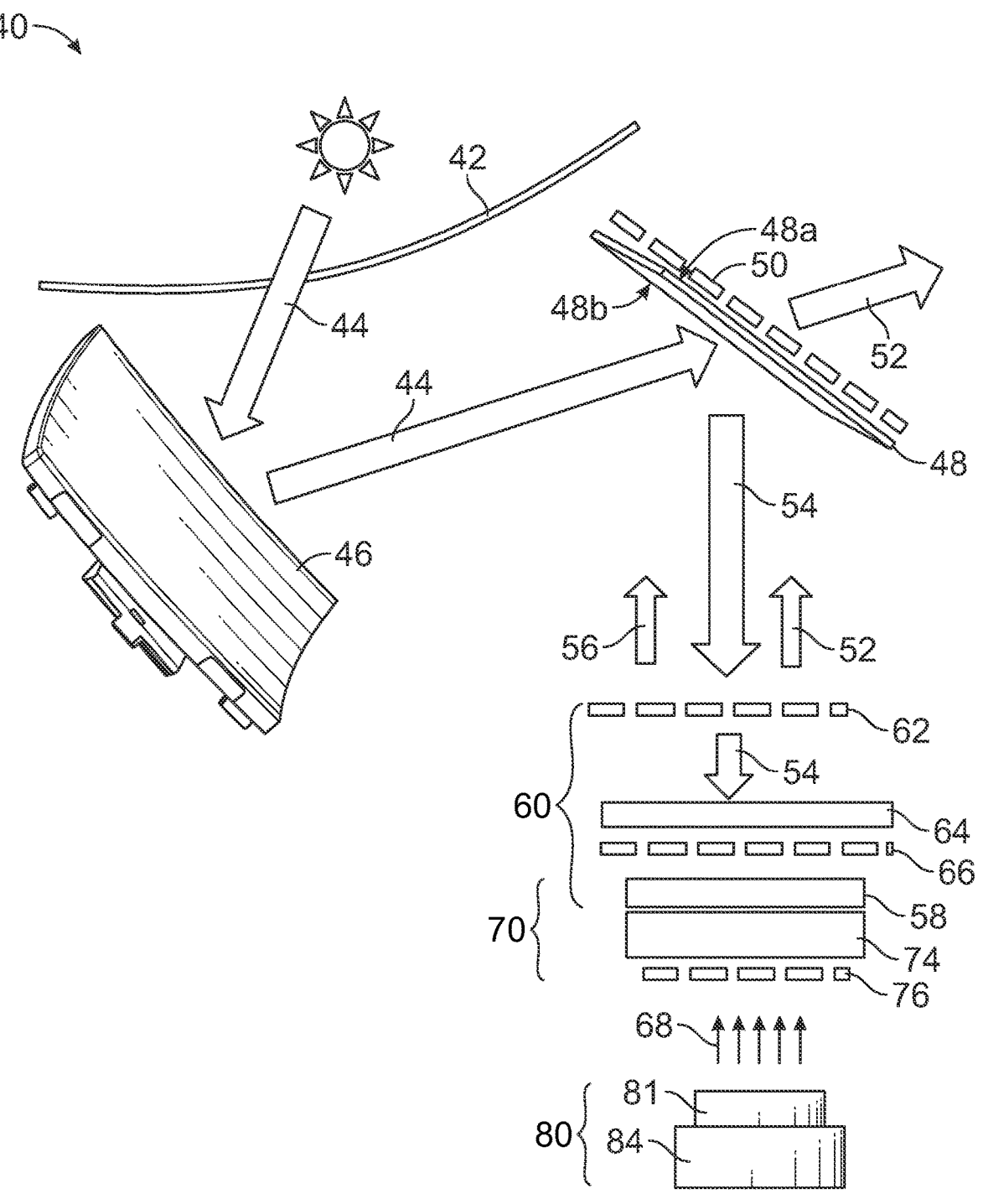
FIG. 3 is a schematic diagram illustrating components of the HUD of FIG. 2, provided in accordance with an embodiment of the current disclosure.
Figure 4:
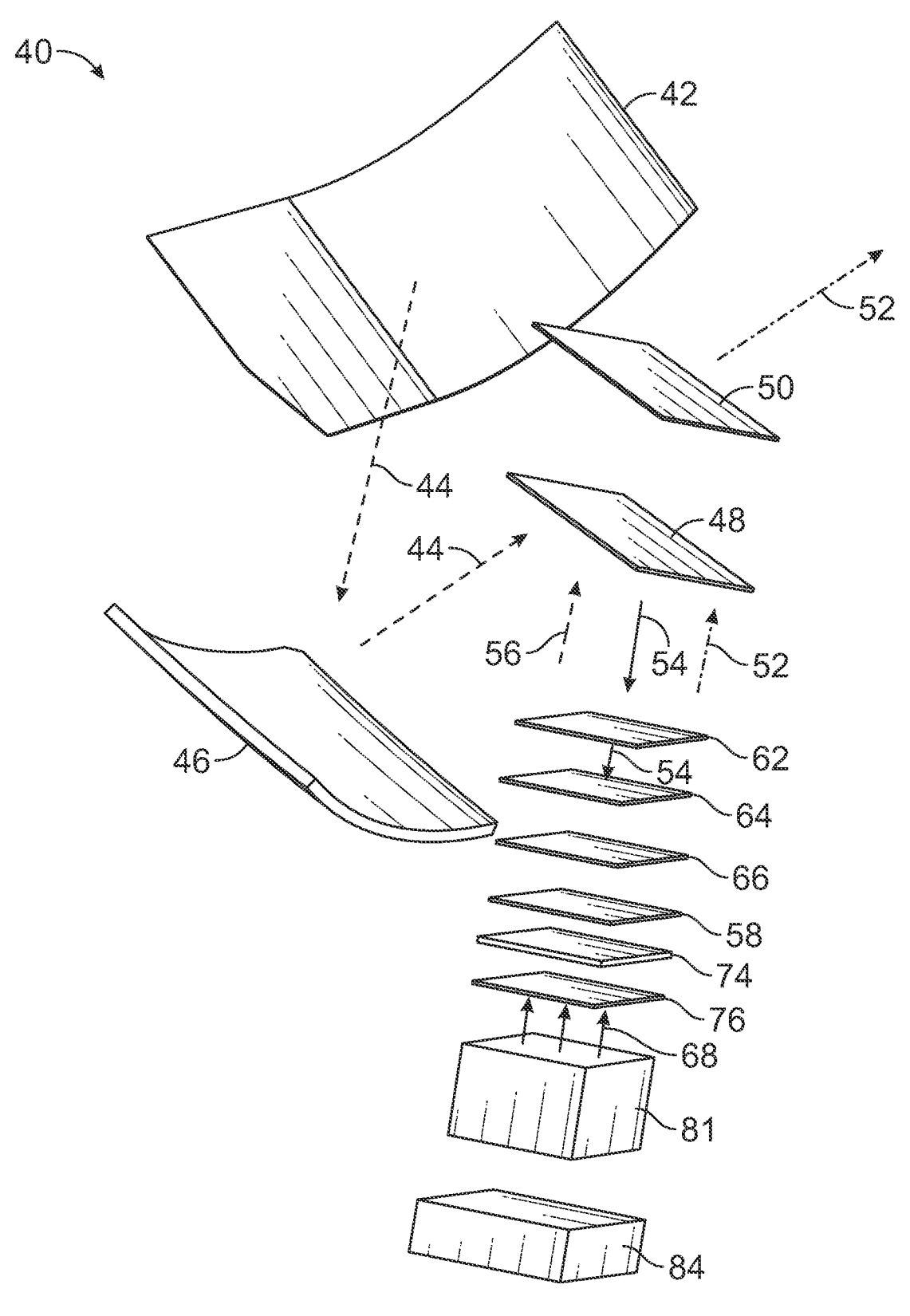
FIG. 4 is an exploded schematic view illustrating the components of the HUD of FIG. 2, provided in accordance with an embodiment of the current disclosure.

The present disclosure provides a HUD 40 with improved resistance to sunlight intensity, or sunload, in accordance with embodiments of the current disclosure. FIG. 2 is a perspective view illustrating a HUD 40 comprising a glare trap 42, a concave mirror 46, a fold mirror 48, a hot mirror glass 64, an LCD 58, and an image generating device 80. In some embodiments, the image generating device 80 comprises an image array 81. In preferred embodiments, the image generating device 80 comprising the image array 81 and a heat sink 84. The LCD 58 is preferably a member of both an LCD assembly 60, and an optical bonding assembly as shown in FIGS. 3 and 4, and as further described below. Alternatively, this disclosure anticipates the use of a digital light processing projector, laser-based projector, holographic engine, or other imaging array which do not utilize an LCD 58. However, preferred embodiments of the current disclosure utilize LCD-based HUD assemblies.

As shown in FIGS. 3 and 4, sunlight 44 that passes through the glare trap 42 may be reflected off the fold mirror 48 before being transmitted to the LCD assembly 60. In some embodiments, the sunlight 44 reflects off the concave mirror 46 before reflecting off the fold mirror 48. While preferred embodiments comprise both the fold mirror 48 and the concave mirror 46, it is anticipated that in some embodiments the HUD 40 comprises the fold mirror 48 but no concave mirror 46, that in other embodiments the HUD 40 comprises the concave mirror 46 but not fold mirror 48, and that in still other embodiments the HUD 40 does not comprise either the fold mirror 48 or the concave mirror. To reduce heat transmitted by the sunlight 44 to the LCD assembly 60, a cold mirror coating 50 is preferably applied to a surface of the fold mirror 48. The fold mirror 48 has sides 48a and 48b, and in preferred embodiments, the cold mirror coating 50 is applied to side 48a. Alternatively, the cold mirror coating may be applied to an optics-facing side of other optical components, such as the concave mirror 46, in lieu of the fold mirror 48. This cold mirror coating reflects only visible spectrum light 54 towards the LCD assembly 60 while infrared (IR) light 52, which carries heat, is transmitted through the fold mirror 48 and is not redirected toward the LCD assembly 60.

As further shown in FIGS. 3 and 4, the LCD assembly 60 comprises at least an LCD 58. In other embodiments, the LCD assembly 60 comprises the LCD 58 and a hot mirror glass 64. In some embodiments, a hot mirror coating 62 is applied to the hot mirror glass 64. In other embodiments, a polarized film 66 is applied to the hot mirror glass 64. In preferred embodiments, the LCD assembly 60 comprises the LCD 58 and the hot mirror glass 64, wherein the hot mirror coating 62 and the polarized film 66 are applied to the hot mirror glass 64. The hot mirror coating 62 further reflects IR 52 and ultraviolet (UV) 56 wavelengths of light away from the LCD 58, further reducing the heat carried by the visible spectrum light 54 that passes through the hot mirror coating 62. A temperature of the LCD 58 is further regulated by inclusion of the optical bonding assembly 70. In some embodiments, the optical bonding assembly 70 comprises an optically bonded (OB) glass sheet 74. In some embodiments, the OB glass sheet 74 is laminated with a cold mirror film (CMF). In other embodiments, the OB glass sheet 74 is bonded to the LCD 58. Bonding the OB glass sheet 74 to the LCD 58 increases a thermal mass of the LCD, thereby increasing the specific heat of the HUD 40 assembly. In preferred embodiments, the OB glass sheet 74 is bonded to the LCD 58 and is also laminated with the cold mirror film (CMF) 76. In collaboration, the cold mirror coating 50 on the fold mirror 48, the LCD assembly 60 with the hot mirror coating 62 and the polarized film 66, and the optical bonding assembly 70 with the OB glass sheet 74 and CMF 76, reduce the amount of heat transmitted by the sunlight 44 to the LCD 58. Moreover, the optical bonding assembly 70 increases the specific heat of the LCD 58, reducing temperature rise. These features allow transmission and reflection of a backlight 68 from the image generating device 80 while also filtering sunlight 44 to reduce heat transmission.

To protect the LCD 58 when the vehicle is off and parked in direct sunlight, the HUD 40 is preferably enclosed within a structural casing that hides components of the HUD 40 from exposure to direct sunlight. Furthermore, the concave mirror 46 preferably rotates when the HUD 40 is powered off, thereby preventing sunlight from being reflected towards the LCD 58.

Figure 5:
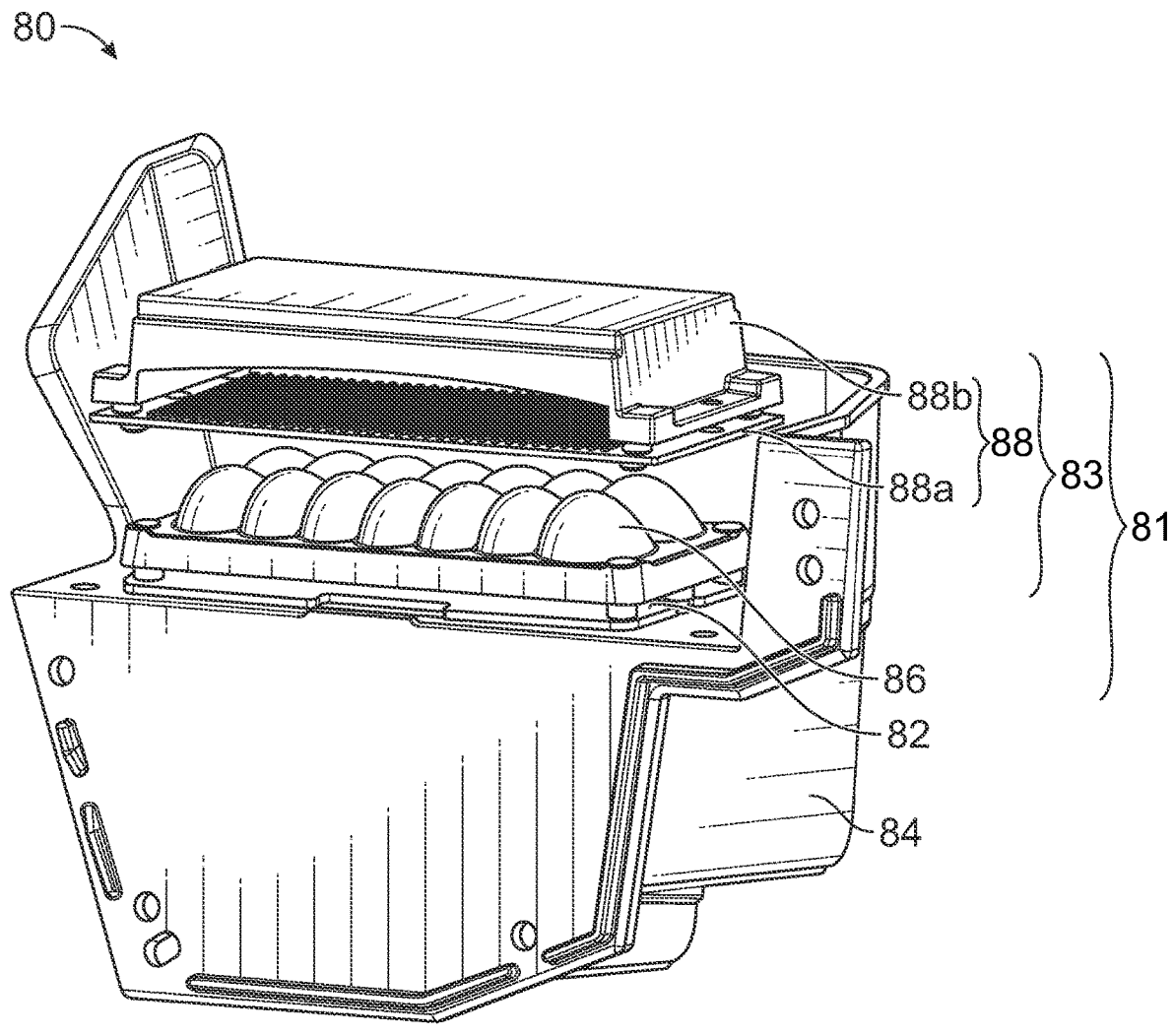
FIG. 5 is a perspective view of an image generating device of the HUD of FIG. 2, provided in accordance with an embodiment of the current disclosure.
Figure 6:
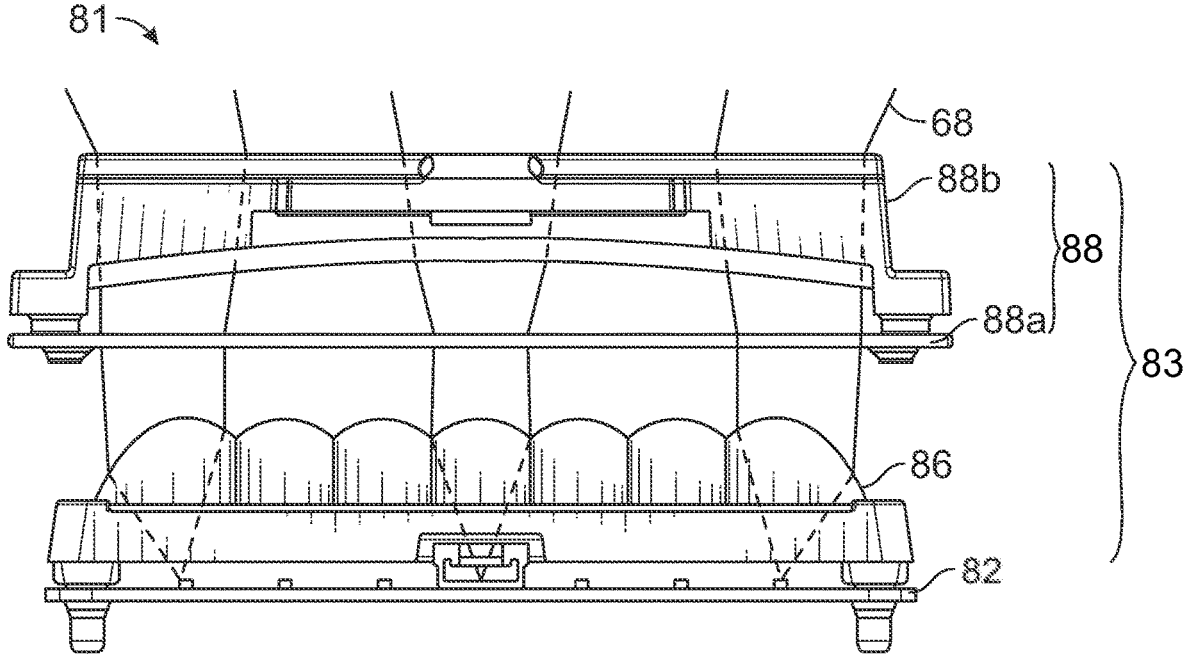
FIG. 6 is an exploded view of an image array within the image generating device of FIG. 5, provided in accordance with an embodiment of the current disclosure.

FIG. 5 is a perspective view of the image generating device 80. FIG. 6 is a schematic illustrating component of the image array 82. As shown in both FIGS. 5 and 6, the image array 81 preferably includes an LED array 82 and a plurality of lenses 83. In some embodiments, the plurality of lenses 83 include a condenser lens 86 and at least one lenticular lens 88. Some embodiments utilize a first lenticular lens 88a and a second lenticular lens 88b. The condenser lens 86 preferably collimates the backlight 68, while the lenticular lenses 88a, 88b shape or direct the backlight 68 toward the optical bonding assembly 70.

Figures 7, 8:
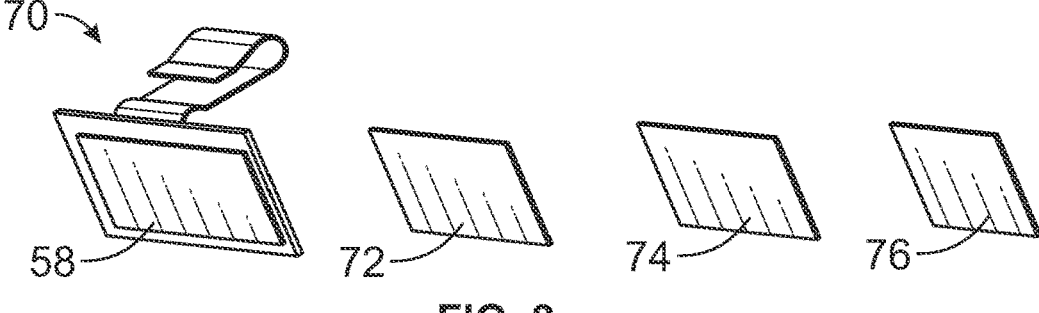
FIG. 7 is an exploded view of an LCD assembly, provided in accordance with an embodiment of the current disclosure.
FIG. 8 is an exploded view of an optical bonding assembly provided in accordance with an embodiment of the current disclosure.

FIG. 7 is an exploded view of the LCD assembly 60 illustrating the transmission of light through the hot mirror glass 64 and polarized film 66. Specifically, the LCD assembly 60 transmits the backlight 68 from the image generating device 80 (not shown) while filtering sunlight 44 of unnecessary wavelengths that carry heat. In preferred embodiments, the hot mirror coating 62 is applied to a front side 64a of the hot mirror glass 64, and the polarized film 66 is preferably applied to a back side 64b of the hot mirror glass 64. This orientation optimizes size and cost of the HUD. However, it is anticipated that the hot mirror coating 62 and polarized film 66 may be applied in other locations on the hot mirror glass 64 and may not cover the entirety of the front side 64a and/or back side 64b. Moreover, it is anticipated that the polarized film 66 may be applied to other components of the HUD 40.

As further shown in FIG. 7, the hot mirror coating 62 on the LCD assembly 60 reflects IR 52 and UV 56 wavelengths of light away from the LCD 58. Both IR 52 and UV 56 wavelengths carry heat, and the reflection of these wavelengths before they hit the LCD 58 reduces the heat transmitted from the sunlight 44. Thus, only visible light 54 passes through the hot mirror coating 62. An example hot mirror coating 62 in a preferred embodiment is made by Murakami in Japan. However, other hot mirror coatings may be used and are contemplated by this disclosure.

FIG. 7 further illustrates the polarized film 66 laminated to the hot mirror glass 64. Nonpolarized, or unpolarized light 65 oscillates in 360° directions while it travels. The polarized film 66 on the back of the hot mirror glass 64 filters the light so that it only oscillates in a desired direction. In some embodiments, the polarized film 66 comprises a fine filter with lattices arranged in a specific direction. This allows wavelengths of light oscillating in a direction parallel to the lattices to pass through while intercepting light that is oscillating in a different direction. In some embodiments, unpolarized sunlight 65 hits the hot mirror glass 64 and is transmitted as unpolarized light 65 through the hot mirror glass 64 before becoming polarized 67 by the polarized film 66 on the back side 64b of the glass 64. In a preferred embodiment, the polarized film 66 filters out p-polarized light. By cutting out the p-polarized light, the polarized film 66 reduces an incoming thermal energy, effectively reducing the amount of overall energy transmitted to the LCD 58 by 50%. Thus, the polarized film 66 reduces the heat transmitted to the LCD 58 by sunlight while also allowing the backlight 68 from the LCD 58 and image generating device 80 to transmit through the hot mirror glass 64 before it is transmitted and/or reflected to reflect an image on the windshield 42.

In a preferred embodiment the polarized film 66 can endure for long periods of time under high temperature conditions while maintaining its preferred function. A preferred polarized film 66 is manufactured under the Pro-Flux™ by Moxtek Inc., in Utah, which is formed of an aluminum film with fine slits upon a glass wafer. However, other polarized films that polarize light based reflections may be used, such as an automatic reflective polarizer manufactured under the 3M™ in Minnesota.

FIG. 8 is an exploded view of the optical bonding assembly 70, comprising the OB glass sheet 74 laminated with the cold mirror film (CMF) 76 which is preferably bonded to the LCD 58 by an optical bonding adhesive 72. The CMF 76 preferably functions as a polarizer, which cuts, or removes, p-polarized light from incoming wavelengths of light. In some embodiments the CMF defines a thickness of 61 μm nominal. A CMF of these specifications is manufactured by 3M™. The CMF may further define a delamination of ≤2.0 mm from an edge of the CMF. In some embodiments the CMF also defines an effective transmission of at least 1.65. Moreover, some embodiments of the CMF define a color shift of 0° of Δx of 0.008 and Δy of 0.008, wherein the A is relative to backlight with no enhancement films. The CMF may also define a preferable color shift 60° of Δx of 0.015 and Δy of 0.015. In some embodiments the CMF defines a haze with a maximum of 1.5% and may define a total transmittance with a minimum of 43%. Furthermore, in some embodiments the CMF preferably defines a reflectivity with a minimum of 50%. However, it is anticipated that one skilled in the art may utilize a CMF that defines a different thickness, delamination, effective transmission, color shift, haze, transmittance, and/or reflectivity without departing from the spirit and scope of the present invention.

The optical bonding adhesive 72 may define an optically clear resin (OCR dispensed resin). Alternatively, the optical bonding adhesive 72 may define an optically clear adhesive (OCA) applied sheet. However, other optical bonding adhesives and methods known in to those skilled in the art are anticipated by this disclosure. The OB glass sheet 74 may define a width of 30-40 mm and a length of 70-90 mm wide. In a preferred embodiment, the OB glass sheet 74 is 81.38 mm by 36.91 mm to correspond with a 3.54-inch LCD 58.

Taken together, the optical bonding assembly 70 and the LCD assembly 60 increase the specific heat of the LCD 58 and reduce temperature rise from sunlight 44. In a preferred embodiment, the LCD 58 is a thin-film transistor, or TFT. TFT LCDs have a preferred pixel pitch, with small gaps between pixels, leading to smooth images without aliasing. This results in an LCD 58 that has a high resolution with good contrast. However, in some embodiments the LCD 58 may instead define a vacuum florescence display (VFD) or other type of LCD display.

To optimize heat reduction while facilitating transition and magnification of the backlight image, the optical bonding assembly 70 is adhered to the LCD 58 between the LCD 58 and the image generating device 80. In some embodiments the optical bonding assembly 70 is 40-100 mm from the image generating device 80. In a preferred embodiment, the optical bonding assembly 70 is 60 mm from the image generating device 80.

The LCD assembly 60 is preferably positioned between the optical bonding assembly 70 and the fold mirror 48. In a preferred embodiment the hot mirror coating 62 covers the front side 64*a* of the hot mirror glass 64, and the polarized film 66 covers the back side 64*b* of the hot mirror glass 64, such that the polarized film 66 lies flush with the LCD 58 on one side, and the hot mirror glass 64 on the other. In this configuration, the front side 64*a* of the hot mirror glass 64, upon which the hot mirror coating 62 is adhered, is facing the fold mirror 48 such that the hot mirror coating 62 is between the hot mirror glass 64 and the fold mirror 48. In some embodiments, the LCD assembly 60 is 50-150 mm from the fold mirror 48. In a preferred embodiment the LCD assembly 60 is 98 mm from the fold mirror 48. However, other orientations of the LCD assembly are anticipated by this disclosure.

In some embodiments the fold mirror 48 is a flat mirror. In other embodiments the fold mirror 48 is an aspheric mirror. Other mirror curvatures are also envisioned by the current disclosure.

In addition to reducing heat from sunlight 44, the OB glass sheet 74 and CMF 76 also provide a reduction in an internal HUD heat generation. Generally, the image generating device 80 in LCD based HUDs generates a not-inconsequential amount of heat, reducing a total sun endurance time of the LCD 58. Utilization of the glass sheet 74 and the CMF 76 reduces the heat generated by the image generating device 80, thereby increasing the total endurance time of the LCD 58.

With the addition of the cold mirror coating 50 on the fold mirror 48, the hot mirror coating 62 and polarized film 66 on the LCD assembly 60, and the OB glass sheet 74 and CMF 76 of the optical bonding assembly 70 (collectively the "design countermeasures"), the amount of time that it takes for sunlight 44 to heat up the LCD 58 to a damaging temperature is increased. Experimental results indicate that a surface temperature of 117° C. can cause temporary or permanent degradation of LCD 58 function. A preferred embodiment utilizing the design countermeasures as set forth in the current disclosure reduces the total energy of sunlight that reaches the LCD 58 by 75.4%.

Figure 9:
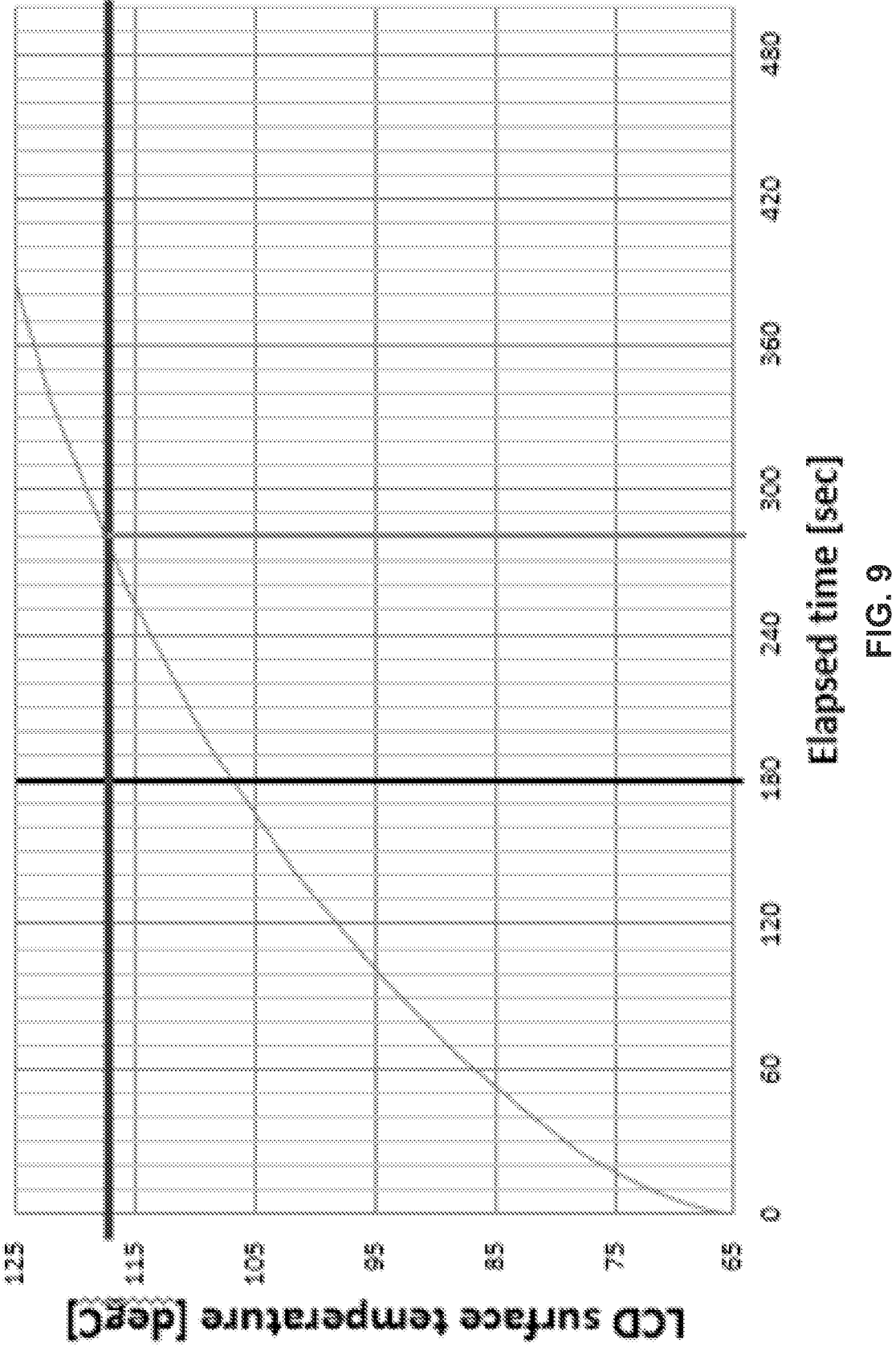
FIG. 9 is a graphical representation of a surface temperature of an LCD surface over time upon exposure to sunlight, provided in accordance with an embodiment of the current disclosure.

FIG. 9 is a graph demonstrating that the addition of the design countermeasures of the current disclosure increases the amount of time that it takes for an LCD 58 surface to reach a temperature of 117° C. to over four minutes. Typical air conditioning units in vehicles in which the HUDs 40 of the current disclosure are fit take an average of three minutes to reduce the internal temperature of the associated vehicle to normal room temperatures. Thus, the four-minute delay in LCD 58 temperature increase afforded by the design countermeasures disclosed herein is more than sufficient to prevent an increase in LCD 58 temperature and resulting damage.

While the invention is described through the above-described exemplary embodiments, modifications to, and variations of, the illustrated embodiments may be made without departing from the inventive concepts disclosed herein. For example, although specific parameter values, such as dimensions, materials, additives and coatings, may be recited in relation to disclosed embodiments, within the scope of the invention, the values of all parameters may vary over wide ranges to suit different applications.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

Although aspects of embodiments may be described with reference to flowcharts and/or block diagrams, functions, operations, decisions, etc. of all or a portion of each block, or a combination of blocks, may be combined, separated into separate operations or performed in other orders.

Disclosed aspects, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

What is claimed is:

1. A head up display (HUD) with improved resistance to sunload for use in a vehicle, the HUD comprising:
   a liquid crystal display (LCD) assembly;
   an optical bonding assembly; and
   an image generating device;
   wherein the LCD assembly comprises an LCD and a hot mirror glass;
   wherein the hot mirror glass comprises a hot mirror coating and a polarized film that are configured to filter sunlight transmitted through the hot mirror glass to reduce heat transmission to the LCD; and
   wherein the optical bonding assembly comprises an optical bonding (OB) glass sheet bonded to, but separate from the LCD, which is bonded to the OB glass sheet using an optical bonding adhesive such that the OB glass sheet is configured to increase a thermal mass of the LCD, and a cold mirror film (CMF) bonded to the OB glass sheet.

2. The HUD of claim 1, wherein the optical bonding assembly is operatively connected to the image generating device, configured to receive a backlight produced by the image generating device, and configured to transmit the backlight to the LCD assembly.

3. The HUD of claim 2, wherein the OB glass sheet is configured to increase a specific heat of the HUD.

4. The HUD of claim 2, wherein the LCD assembly is operatively connected to the optical bonding assembly and is configured to receive the backlight from the optical bonding assembly.

5. The HUD of claim 4, wherein the hot mirror coating covers a front side of the hot mirror glass, is configured to reflect infrared (IR) and ultraviolet (UV) wavelengths of sunlight away from the LCD and is configured to permit the transmission of the backlight from the LCD through the hot mirror glass.

6. The HUD of claim 4, wherein the polarized film covers a back side of the hot mirror glass and is configured to cut p-polarized light from sunlight reflected onto the LCD, reducing a heat of the sunlight reflected onto the LCD.

7. The HUD of claim 4, additionally comprising a fold mirror, wherein the fold mirror is operatively connected with the LCD assembly, configured to receive the backlight from the LCD assembly, and configured to transmit the backlight to a suitable reflective surface such as a windshield.

8. The HUD of claim 7, additionally comprising a concave mirror, wherein the fold mirror is operatively connected with the LCD assembly, configured to receive the backlight from the LCD assembly, and configured to transmit the backlight to the concave mirror, and thence to a suitable reflective surface such as a windshield.

9. The HUD of claim 7, additionally comprising a cold mirror coating applied to the fold mirror, wherein the cold mirror coating is configured to reflect only a visible spectrum of light towards the LCD assembly and is configured to transmit infrared light through the fold mirror and away from the LCD.

10. The HUD of claim 1, wherein the image generating device comprises an image array and a heat sink.

11. The HUD of claim 10, wherein the image array comprises an LED array and a plurality of lenses.

12. The HUD of claim 11, wherein the plurality of lenses includes at least one condenser lens and at least one lenticular lens.

13. The HUD of claim 1, wherein the LCD comprises a thin-film transistor (TFT).

14. The HUD of claim 1, wherein the fold mirror is a flat mirror.

15. The HUD of claim 1, wherein the fold mirror is an aspheric mirror.

16. The HUD of claim 1, additionally comprising a glare trap.

17. The HUD of claim 1, wherein the CMF defines an effective transmission of at least 1.65.

18. The HUD of claim 1, wherein the CMF defines a color shift 0° of $\Delta x$ of 0.008 and $\Delta y$ of 0.008, wherein the $\Delta$ is relative to backlight with no enhancement films.

19. The HUD of claim 1, wherein the CMF defines a color shift 60° of $\Delta x$ of 0.015 and $\Delta y$ of 0.015.

20. The HUD of claim 1, wherein the CMF defines a haze with a maximum of 1.5%, a total transmittance with a minimum of 43% and a reflectivity with a minimum of 50%.

* * * * *